(12) United States Patent
Cheng et al.

(10) Patent No.: US 8,595,224 B2
(45) Date of Patent: Nov. 26, 2013

(54) SMART PATH FINDING FOR FILE OPERATIONS

(75) Inventors: Lee-chu Cheng, Austin, TX (US); Bradford L. Cobb, Cedar Park, TX (US); Glen E. Ghalemin, Austin, TX (US); Wen-Yuen Wayne Huang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1386 days.

(21) Appl. No.: 11/232,768

(22) Filed: Sep. 22, 2005

(65) Prior Publication Data

US 2007/0067353 A1 Mar. 22, 2007

(51) Int. Cl.
*G06F 7/00* (2006.01)
*G06F 17/30* (2006.01)

(52) U.S. Cl.
USPC .................. 707/726; 707/795; 709/240

(58) Field of Classification Search
USPC ............ 707/795, 726, 999.102, 752, 758
See application file for complete search history.

(56) References Cited

U.S. PATENT DOCUMENTS

| | | | |
|---|---|---|---|
| 5,544,360 A * | 8/1996 | Lewak et al. ................ 1/1 |
| 5,659,785 A * | 8/1997 | Pechanek et al. ............ 712/11 |
| 5,671,386 A * | 9/1997 | Blair et al. .................... 711/5 |
| 5,880,730 A * | 3/1999 | Durand ...................... 715/846 |
| 6,324,581 B1 * | 11/2001 | Xu et al. ..................... 709/229 |
| 7,203,966 B2 * | 4/2007 | Abburi et al. ................ 726/29 |
| 7,233,992 B1 * | 6/2007 | Muldoon et al. ............. 709/226 |
| 7,343,320 B1 * | 3/2008 | Treyz et al. ................. 705/26.5 |
| 2002/0002556 A1 * | 1/2002 | Yoshida et al. ............. 707/102 |
| 2004/0024848 A1 * | 2/2004 | Smith et al. ................. 709/219 |
| 2004/0073691 A1 * | 4/2004 | Sun ............................. 709/230 |
| 2005/0131738 A1 * | 6/2005 | Morris ........................... 705/2 |
| 2005/0262090 A1 * | 11/2005 | Correl et al. ................. 707/10 |
| 2006/0020513 A1 * | 1/2006 | Nagano et al. ................ 705/14 |
| 2006/0062094 A1 * | 3/2006 | Nathan et al. ............ 369/30.06 |
| 2007/0028302 A1 * | 2/2007 | Brennan et al. .............. 726/24 |
| 2007/0028303 A1 * | 2/2007 | Brennan ....................... 726/24 |

OTHER PUBLICATIONS

Levy et al., "Distributed File systems: Concepts and Examples". ACM 1990.*
Sperber et al., Bootstrapping Higher-Order Program Transformers from Interpreters. ACM 1996.*
Vasilyeva et al., Leveraging Flexible Data Management with Graph Databases. ACM 2013.*

* cited by examiner

*Primary Examiner* — Daniel Kuddus
(74) *Attorney, Agent, or Firm* — Suiter Swantz pc llo

(57) ABSTRACT

A method of smart path finding for a file operation is disclosed. A data structure is provided to store reference points, file paths and use counts. Each of the reference points is a URL or an email ID and is associated with at least one of the file paths. Each of the use counts is tied to one of the file paths. The data structure is searched when a reference point is hit for downloading, uploading, attaching or detaching a file. When the reference point is found to be or to be similar to one of the reference points, one or more file paths associated with the one of the reference points are ordered, by one or more use counts tied to the one or more file paths, to form a list including one or more suggested file paths for downloading, uploading, attaching or detaching the file.

16 Claims, 2 Drawing Sheets

SMART PATH FINDING FOR FILE OPERATIONS

FIELD OF THE INVENTION

The present invention generally relates to file operations, particularly to a method of smart path finding for a file operation.

BACKGROUND OF THE INVENTION

When downloading a file from a website, a path is often needed for storing the file. For example, on MS Windows 2000 this means working with a "Save As" pop-up, clicking on "Browse" button, clicking multiple times (typically) down a directory structure, and finally reaching the target folder. This is a very tedious and unproductive procedure that an office worker may have to repeat many times in a typical day. This problem is not only associated with internet downloads, but also accompanies File Transfer Protocol (FTP) download, email file detachment, email file attachment operations, and the like. Currently, there is no solution in the industry. The closest solution may be found in MS Windows 2000, which suggests the "last folder used" for storing the new file. However, in most of the cases this points one to a folder the user does not want to use.

Thus, it is desirable to provide a method to effectively address the foregoing described problem.

SUMMARY OF THE INVENTION

In an exemplary aspect of the present invention, a method of smart path finding for a file operation is disclosed. A data structure is provided to store reference points, file paths and use counts. Each of the reference points is a URL or an email ID and is associated with at least one of the file paths. Each of the use counts is tied to one of the file paths. The data structure is searched when a reference point is hit for downloading, uploading, attaching or detaching a file. When the reference point is found to be or to be similar to one of the reference points, one or more file paths associated with the one of the reference points are ordered, by one or more use counts tied to the one or more file paths, to form a list including one or more suggested file paths for downloading, uploading, attaching or detaching the file.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 3 shows an array of URLs in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

Figure 1:
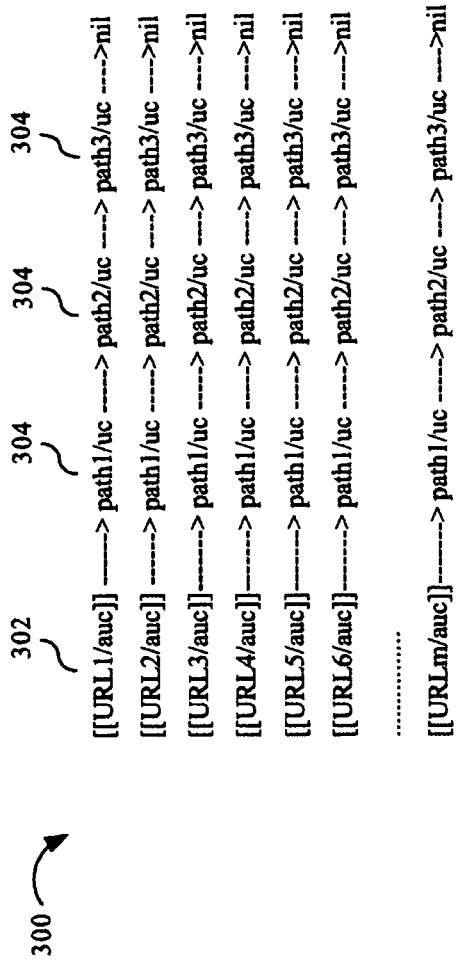
FIG. 1 shows typical URL-to-folder relationships.

Based on user experiences, it is often the case that each file download Uniform Resource Locator (URL) is associated with one or more particular file paths for storing the downloaded file. For example, FIG. 1 shows typical URL-to-folder relationships. As shown, the URL to file folder mappings tend to be 1:1 in most cases, or 1:n (n being a small positive integer greater than 1) in some cases.

In an embodiment, the present invention utilizes a small data structure (e.g., a flat file, a tiny database, or the like) to store the URL-to-file-path mappings. A use count is tied to each file path. When a URL is hit for downloading within a browser, this data structure is referenced and/or searched. If the URL (or a similar URL) is found within the data structure, the file path(s) associated with the URL may be listed and ordered by the use count, which may form a list of suggested paths for the user. Preferably, the most frequently used path is at the top of the list. The present invention may apply to FTP download, email files detachment, and email file attachment operations without departing from the scope and spirit of the present invention. In the case of email file attachment and detachment, the email ID (as opposed to the URL) may be used as the reference point for the proper file path.

Thus, in an embodiment, the present invention provides a method for storing one or more paths that have been used for saving the files from a particular URL (or email ID). This information may then be presented to the user when the same URL (email ID) is hit for a new file download, thereby providing smart path finding for a file operation.

Figure 2:
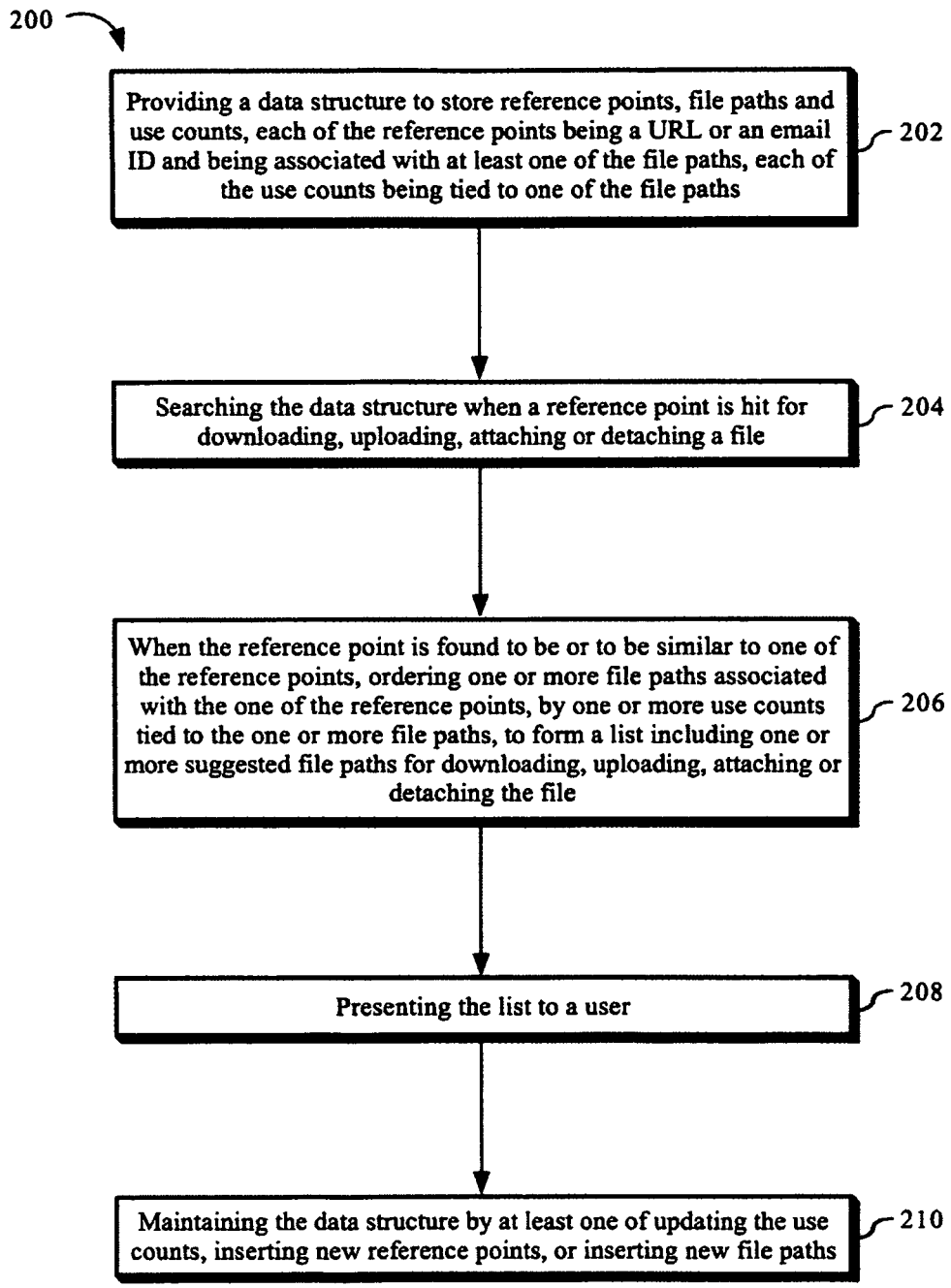
FIG. 2 is a flowchart of a method of smart path finding for a file operation in accordance with an exemplary embodiment of the present invention.

FIG. 2 is a flowchart of a method 200 of smart path finding for a file operation in accordance with an exemplary embodiment of the present invention. A data structure is provided to store reference points, file paths and use counts 202. The data structure may be a flat file, a database, or the like. Each of the reference points may be a URL, an email ID, or the like and is associated with at least one of the file paths. Each of the use counts may be tied to one of the file paths. The data structure is searched when a reference point is hit for downloading, uploading, attaching or detaching a file 204. When the reference point is found to be or to be similar to one of the reference points contained in the data structure, one or more file paths associated with the one of the reference points are ordered, by one or more use counts tied to the one or more file paths, to form a list including one or more suggested file paths for downloading, uploading, attaching or detaching the file 206. Preferably, the most frequently used file path associated with the one of the reference points is at the top of the list. The list may then be presented to a user 208. The data structure may be maintained by updating the use counts, inserting new reference points, and/or inserting new file paths 210.

FIG. 3 shows an array 300 of URLs 302 (or email IDs) in accordance with an exemplary embodiment of the present invention. The array 300 may be included in the data structure described in FIG. 2. The length of each array entry may be fixed for easy implementation (e.g., by truncating very long URLs) or variable for saving storage use. The variable length design may become beneficial when the number of URLs (or email IDs) becomes very large. The number of URLs 302 may be controlled by a computer system or defined by a user. A typical number may be 100 or less. However, when the same array 300 is used for both URLs and email IDs, this number may be increased. Each URL array entry may point to a linked list of file path nodes 304. The maximum number n of linked list nodes 304 may be tunable by a user. Each file path node 304 may store file path info and a use count ("uc" represents use count in FIG. 3). For any URL comes in, a search is performed throughout the array 300. If the URL is found to be one of the URLs 302 contained in the array 300, the file path node(s) 304 associated with the URL may be read, displayed and ordered by the use count. If the suggested file path(s) fails to cover the correct destination, a user may input a new path to the computer system. The new path may then be inserted into the linked list as a new node. If the URL (or email ID) is not found in the array 300 (i.e., this is a new URL or email ID), an entry may be added to the array 300. Each array entry may also be implemented with an array element use count ("auc" represents array element use count in FIG. 3) to keep the most popular URLs in the array 300. Thus, the data structure may be maintained by updating the use counts and inserting new URL and any new file path information.

The present invention may be applied to the following: (1) FTP; (2) a web download target location; (3) email detachment to a target location; (4) email attachment from a location; (5) application program prompt of input or output locations; and (6) other computing environment that requests target file paths.

According to an embodiment of the present invention, there are many ways to construct the "key" for accessing the data structure (to generate the "smart file path"): (1) a FTP source location; (2) the URL of the web download site (full or partial); (3) the email ID of the sender (full or partial); (4) the application program type and vendor; (5) application program names; (6) the naming convention of the files that are mapped to pre-set locations; (7) the type of the file being stored (e.g., mp3, mpeg, doc, zip, midi, etc.); (8) certain keywords contained in the file name or a file descriptor (if implemented); and the like.

When the present smart system generates the suggested file paths, a list of the suggested target locations (paths), ordered by the use count, may be provided with the most frequently used location at the top. The number of entries in the list may be user tunable (e.g. 3 or 5, etc). The last used target path may be highlighted in different color, regardless the use count number. A default location may always be presented, which may be specified by the user (e.g. /myDownLoad). A system default location may be shown if it is not overridden by the user (e.g. myDocument).

The present invention may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computer implemented method, comprising:
   storing a first reference point and at least one file path, said at least one file path comprising a location, associated with said first reference point in a data structure, wherein a first file associated with said first reference point is one of downloaded by a user to said at least one file path, uploaded by said user from said at least one file path, attached by said user from said at least one file path, and detached by said user to said at least one file path;
   storing a use count associated with a corresponding one of said at least one file path, said use count indicating a number of times said at least one file path has been utilized for downloading, uploading, attaching or detaching a file through web browsing, file transfer protocol (FTP) download, email files detachment, or email file attachment operations;
   receiving a file operation for a second file associated with a second reference point, the file operation being one of downloading, uploading, attaching, and detaching said second file;
   comparing the second reference point to said first reference point when said second reference point is accessed for one of downloading, uploading, attaching, and detaching the second file;
   generating an ordered list comprising said at least one file path when said second reference point is determined to be similar to said first reference point, said ordered list ordered utilizing said use count associated with said corresponding one of said at least one file path;

presenting said ordered list to the user; and receiving input from the user for one of downloading said second file to one of said at least one file path presented in said ordered list, uploading said second file from one of said at least one file path presented in said ordered list, attaching said second file from one of said at least one file path presented in said ordered list, and detaching said second file to one of said at least one file path presented in said ordered list, wherein the at least one file path is ordered at a top of said ordered list when said use count associated with said at least one file path is greater than another use count associated with another file path in said ordered list.

2. The method of claim 1, wherein said data structure is a flat file or a database.

3. The method of claim 1, wherein said data structure includes an array of at least one uniform resource locator (URL) entry, each URL array entry pointing to a linked list of at least one file path node, each file path node storing file path information and a use count.

4. The method of claim 3, further comprising searching through said array for a URL and, when said URL is included in said array, reading and displaying said at least one file path node associated with said URL.

5. The method of claim 4, further comprising inserting a new file path into said at least one file path node associated with said URL.

6. The method of claim 4, further comprising adding said URL to said array when said URL is not found in said array.

7. The method of claim 1, further comprising maintaining said data structure by at least one of updating said use count, inserting a new reference point, and inserting a new file path.

8. The method of claim 1, wherein the first reference point comprises at least one of a uniform resource locator (URL) and an email identifier and the second reference point comprises at least one of a uniform resource locator (URL) and an email identifier.

9. A non-transitory computer-readable storage medium having a computer program product stored thereon and executed by a computer system, causes the computer system to:

store a first reference point and at least one file path associated with said first reference point in a data structure, wherein a file associated with said first reference point is one of downloaded by a user to said at least one file path, uploaded by said user from said at least one file path, attached by said user from said at least one file path, and detached by said user to said at least one file path;

store a use count associated with a corresponding one of said at least one file path, said use count indicating a number of times said at least one file path has been utilized for downloading, uploading, attaching or detaching a file through web browsing, file transfer protocol (FTP) download, email files detachment, or email file attachment operations;

receive a file operation for a second file associated with a second reference point, the file operation being one of downloading, uploading, attaching, and detaching said second file;

compare the second reference point to said first reference point when said second reference point is accessed for one of downloading, uploading, attaching, and detaching the second file;

generate an ordered list comprising said at least one file path when said second reference point is determined to be similar to said first reference point, said ordered list ordered utilizing said use count associated with said corresponding one of said at least one file path;

present said ordered list to the user; and receive input from the user for one of downloading said second file to one of said at least one file path presented in said ordered list, uploading said second file from one of said at least one file path presented in said ordered list, attaching said second file from one of said at least one file path presented in said ordered list, and detaching said second file to one of said at least one file path presented in said ordered list, wherein the at least one file path is ordered at a top of said ordered list when said use count associated with said at least one file path is greater than another use count associated with another file path in said ordered list.

10. The non-transitory computer readable storage medium of claim 9, wherein said data structure is a flat file or a database.

11. The non-transitory computer readable storage medium of claim 9, wherein said data structure includes an array of at least one uniform resource locator (URL) entry, each URL array entry pointing to a linked list of at least one file path node, each file path node storing file path information and a use count.

12. The non-transitory computer readable storage medium of claim 11, wherein the computer readable program product when executed on the computer system further causes the computer system to search through said array for a URL and, when said URL is included in said array, read and display said at least one file path node associated with said URL.

13. The non-transitory computer readable storage medium of claim 12, wherein the computer program product when executed on the computer system further causes the computer system to insert a new file path into said at least one file path node associated with said URL.

14. The non-transitory computer readable storage medium of claim 12, wherein the computer program product when executed on the computer system further causes the computer system to add said URL to said array when said URL is not found in said array.

15. The non-transitory computer readable storage medium of claim 9, wherein the computer program product when executed on the computer system further causes the computer system to maintain said data structure by at least one of updating said use count, inserting a new reference point, and inserting a new file path.

16. The non-transitory computer readable storage medium of claim 9, wherein the first reference point comprises at least one of a uniform resource locator (URL) and an email identifier and the second reference point comprises at least one of a uniform resource locator (URL) and an email identifier.

* * * * *